United States Patent
Hong (10) Patent No.: US 9,055,331 B2
(45) Date of Patent: Jun. 9, 2015

(54) VIDEO PROCESSING APPARATUS AND CONTROL METHOD THEREOF FOR SELECTING A CHANNEL AMONG A PLURALITY OF CHANNELS

(75) Inventor: Ki-joo Hong, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 509 days.

(21) Appl. No.: 12/113,221

(22) Filed: May 1, 2008

(65) Prior Publication Data

US 2009/0037952 A1     Feb. 5, 2009

(30) Foreign Application Priority Data

Aug. 1, 2007   (KR) ................. 10-2007-0077431

(51) Int. Cl.
*H04N 5/445*     (2011.01)
*H04N 21/438*   (2011.01)
(Continued)

(52) U.S. Cl.
CPC ....... *H04N 21/4383* (2013.01); *H04N 21/4348* (2013.01); *H04N 21/4341* (2013.01); *H04N 21/4668* (2013.01); *H04N 5/50* (2013.01); *H04N 7/163* (2013.01); *H04N 21/4345* (2013.01); *H04N 21/4347* (2013.01); *H04N 21/4532* (2013.01); *H04N 21/4755* (2013.01); *H04N 21/4821* (2013.01)

(58) Field of Classification Search
CPC .......... H04N 21/422; H04N 21/42207; H04N 21/42215; H04N 21/42216; H04N 21/42607; H04N 21/4263; H04N 21/4358; H04N 21/4383; H04N 21/4384; H04N 21/4532; H04N 2/4821; H04N 21/4823; H04N 21/4826; H04N 5/50; H04N 7/163; H04N 21/4345; H04N 21/4755; H04N 21/4821; H04N 21/4347
See application file for complete search history.

(56) References Cited

U.S. PATENT DOCUMENTS 6,137,539 A * 10/2000 Lownes et al. ................. 348/569
6,763,522 B1 * 7/2004 Kondo et al. ................... 725/39

(Continued)

FOREIGN PATENT DOCUMENTS

KR   10-2005-0075549 A    7/2005
KR       10-0709410 B1    4/2007

OTHER PUBLICATIONS

Communication dated Aug. 6, 2013 issued by the Korean Intellectual Property Office in counterpart Korean Patent Application No. 10-2007-0077431.

(Continued)

*Primary Examiner* — An Son P Huynh
(74) *Attorney, Agent, or Firm* — Sughrue Mion, PLLC (57) ABSTRACT

There are provided a video processing apparatus and a control method thereof. The video processing apparatus includes: a receiver which receives a broadcast signal of a major channel; and a controller which controls the receiver to receive the major channel selected by a user among the plurality of major channels, and controls to automatically select one of a plurality of minor channels of the selected major channel if the selected major channel has the plurality of minor channels. The control method includes: determining whether one of a plurality of major channels is selected; receiving a broadcast signal of the selected major channel; determining whether the selected major channel has a plurality of minor channels; and automatically selecting one of the minor channels according to the selected major channel if the selected major channel has the plurality of minor channels.

29 Claims, 5 Drawing Sheets (51) Int. Cl.
*H04N 21/434* (2011.01)
*H04N 21/466* (2011.01)
*H04N 5/50* (2006.01)
*H04N 7/16* (2011.01)
*H04N 21/45* (2011.01)
*H04N 21/475* (2011.01)
*H04N 21/482* (2011.01)

(56) References Cited

U.S. PATENT DOCUMENTS

| | | | |
|---|---|---|---|
| 6,766,526 B1 * | 7/2004 | Ellis | 725/57 |
| 7,027,106 B2 * | 4/2006 | Takagi et al. | 348/731 |
| 7,100,189 B2 * | 8/2006 | Kim | 725/100 |
| 7,154,564 B2 * | 12/2006 | Kim | 348/731 |
| 7,281,259 B2 * | 10/2007 | Takagi et al. | 725/38 |
| 8,132,208 B2 * | 3/2012 | Gonzalez | 725/46 |
| 8,191,094 B2 * | 5/2012 | Azera et al. | 725/53 |
| 8,407,738 B2 * | 3/2013 | Beyabani et al. | 725/39 |
| 8,502,923 B2 * | 8/2013 | Hong | 348/705 |
| 2001/0052124 A1 * | 12/2001 | Kim et al. | 725/39 |
| 2002/0067775 A1 * | 6/2002 | Yamanishi | 375/316 |
| 2002/0097164 A1 * | 7/2002 | Takagi et al. | 340/825 |
| 2002/0157092 A1 * | 10/2002 | Kitsukawa et al. | 725/9 |
| 2003/0018972 A1 * | 1/2003 | Arora | 725/47 |
| 2003/0084448 A1 * | 5/2003 | Soundararajan | 725/46 |
| 2003/0229900 A1 * | 12/2003 | Reisman | 725/87 |
| 2004/0047590 A1 * | 3/2004 | Matsuo | 386/46 |
| 2004/0221307 A1 * | 11/2004 | Arai et al. | 725/44 |
| 2004/0264507 A1 * | 12/2004 | Cho et al. | 370/480 |
| 2005/0036068 A1 * | 2/2005 | Shin | 348/565 |
| 2005/0273838 A1 * | 12/2005 | Witheiler | 725/126 |
| 2006/0015903 A1 * | 1/2006 | MacBeth et al. | 725/46 |
| 2006/0242665 A1 * | 10/2006 | Knee et al. | 725/38 |
| 2006/0285015 A1 * | 12/2006 | Choi et al. | 348/565 |
| 2007/0064150 A1 * | 3/2007 | Lee | 348/468 |
| 2007/0101370 A1 * | 5/2007 | Calderwood | 725/47 |
| 2007/0157236 A1 * | 7/2007 | Kim | 725/38 |
| 2007/0157260 A1 * | 7/2007 | Walker | 725/86 |
| 2007/0204297 A1 * | 8/2007 | Gonzalez | 725/41 |
| 2007/0277214 A1 * | 11/2007 | Kim et al. | 725/131 |
| 2008/0074557 A1 * | 3/2008 | Hong | 348/734 |
| 2008/0141317 A1 * | 6/2008 | Radloff et al. | 725/87 |
| 2009/0320072 A1 * | 12/2009 | McClanahan et al. | 725/47 |

OTHER PUBLICATIONS

Communication dated Feb. 3, 2014 issued by the Korean Intellectual Property Office in counterpart Korean Application No. 10-2007-0077431.

Communication dated Nov. 18, 2014, issued by the Korean Intellectual Property Office in counterpart Korean Application No. 10-2014-0038177.

* cited by examiner

| MAJOR CHANNEL NUMBER | MINOR CHANNEL NUMBER | RESOLUTION | GENRE |
|---|---|---|---|
| 2 | 1 | 480P | DRAMAS |
|   | 2 | 720P | MOVIES |
| 3 | 1 | 480P | COMEDIES |
|   | 3 | 480P | HOME SHOPPING |
|   | 5 | 480P | COMEDIES |
| 4 | 1 | 480i | MUSIC |
|   | 2 | 720i | ANIMATION |
|   | 7 | 720P | MOVIES |
|   | 8 | 480P | DOCUMENTARIES |
| ⋮ | ⋮ | ⋮ | ⋮ |

VIDEO PROCESSING APPARATUS AND CONTROL METHOD THEREOF FOR SELECTING A CHANNEL AMONG A PLURALITY OF CHANNELS

CROSS-REFERENCE TO RELATED APPLICATIONS

This application claims priority from Korean Patent Application No. 10-2007-0077431, filed on Aug. 1, 2007, in the Korean Intellectual Property Office, the disclosure of which is incorporated herein by reference.

BACKGROUND OF INVENTION

1. Field of Invention

Apparatuses and methods consistent with the present invention relate to a video processing apparatus and a control method thereof, and more particularly, to a video processing apparatus which processes received multi mode service (hereinafter, to be called MMS), and a control method thereof.

2. Description of Related Art

Digital broadcast has commenced in full-scale. Unlike analog broadcast, the digital broadcast provides multi mode service which transmits a plurality of service contents through a single channel by using a compression method with high channel efficiency.

For example, if 64QAM (quadrature amplitude modulation) or 256 QAM is used, dozens of image contents may be transmitted through a single channel. To classify several channels and the plurality of video image contents supplied through the channels, virtual channel numbers are used. The virtual channel numbers connect two numbers by a hyphen. For example, if the virtual channel numbers are 11-1, 11-2, . . . 11-3, 11-4, . . . , the number "11" before the hyphen is a major channel while the number after the hyphen is a minor channel.

The major channel refers to a physical frequency band through which the plurality of video image contents is transmitted. The minor channel classifies the plurality of video image contents supplied through the same major channel, and refers to a signal vector region to receive the video image contents through the channel. If the single major channel includes the plurality of minor channels as above, the increased number of channels can be provided through the same physical frequency band.

However, the channel is not changed if only the major channel is selected in the MMS. Thus, a user should select both the major channel and the minor channel. That is, a user should sequentially select buttons "1", "-" and "1" through a remote controller or the like to change the channel to the channel number 1-1. It is inconvenient to select the buttons at least three times.

Thus, methods of selecting a channel without inputting the major and minor channels have been disclosed.

According to the first method, if a user selects a major channel, minor channels included in the selected major channel are displayed as OSD (on screen display) so that a user can select one of a plurality of minor channels. However, it is still inconvenient that a user should select the major channel and then select the minor channel again.

According to the second method, a user sets a desired minor channel among a plurality of minor channels included in respective major channels. Then, if the user selects a major channel, the channel is changed to the set minor channel.

However, it is very inconvenient to set the minor channels included in several dozens of or hundreds of major channels. Also, it takes too much time.

SUMMARY OF INVENTION

Accordingly, it is an aspect of the present invention to provide a video processing apparatus which automatically selects one of a plurality of minor channels included in a major channel if the major channel is selected, and a control method thereof.

Additional aspects and/or advantages of the present invention will be set forth in part in the description which follows and, in part, will be obvious from the description, or may be learned by practice of the present invention.

The foregoing and/or other aspects of the present invention are achieved by providing a video processing apparatus, including: a receiver which receives a video image of a major channel; and a controller which controls the receiver to receive the major channel selected by a user among the plurality of major channels, and controls to select one of a plurality of minor channels of the selected major channel if the selected major channel has the plurality of minor channels.

The controller may check information on the plurality of minor channels and selects one of the minor channels according to a preset priority.

The priority may include at least one of resolution of video images, favorite genre and channel number of the minor channels.

The priority may be set by a user.

The priority may be set by a weight that is calculated based on resolution of video images, favorite genre and channel number of the minor channels.

The priority may be set by a user's viewing history.

The video processing apparatus may further include a user input unit to select the major channel.

The priority may include a plurality of items including a first item and a second item different from the first item, and the controller may select one of the minor channels according to the second item if information on the plurality of minor channels corresponding to the first item is equivalent.

The foregoing and/or other aspects of the present invention can be also achieved by providing a control method of a video processing apparatus, including: determining whether one of a plurality of major channels is selected; receiving a video image of the selected major channel; determining whether the selected major channel has a plurality of minor channels; and selecting one of the minor channels according to the selected major channel if the selected major channel has the plurality of minor channels.

The selecting one of the minor channels may include: checking information on the plurality of minor channels; and selecting one of the minor channels according to a preset priority.

The priority may include at least one of resolution of the video images, favorite genre and channel number.

The priority may be set by a user.

The priority may be set by a weight that is calculated based on resolution of the video images, favorite genre and channel number of the plurality of minor channels.

The priority may be set by a user's viewing history.

The priority may include a plurality of items including a first item and a second item different from the first item, and the selecting one of the minor channels may include selecting one of the minor channels according to the second item if information on the plurality of minor channels corresponding to the first item is equivalent.

BRIEF DESCRIPTION OF DRAWINGS

The above and/or other aspects of the present invention will become apparent and more readily appreciated from the following description of the embodiments, taken in conjunction with the accompanying drawings of which.

DETAILED DESCRIPTION OF EXEMPLARY EMBODIMENT

Hereinafter, exemplary embodiments of the present invention will be described with reference to the accompanying drawings, wherein like numerals refer to like elements and repetitive descriptions will be avoided as necessary.

First Exemplary Embodiment

Figure 1:
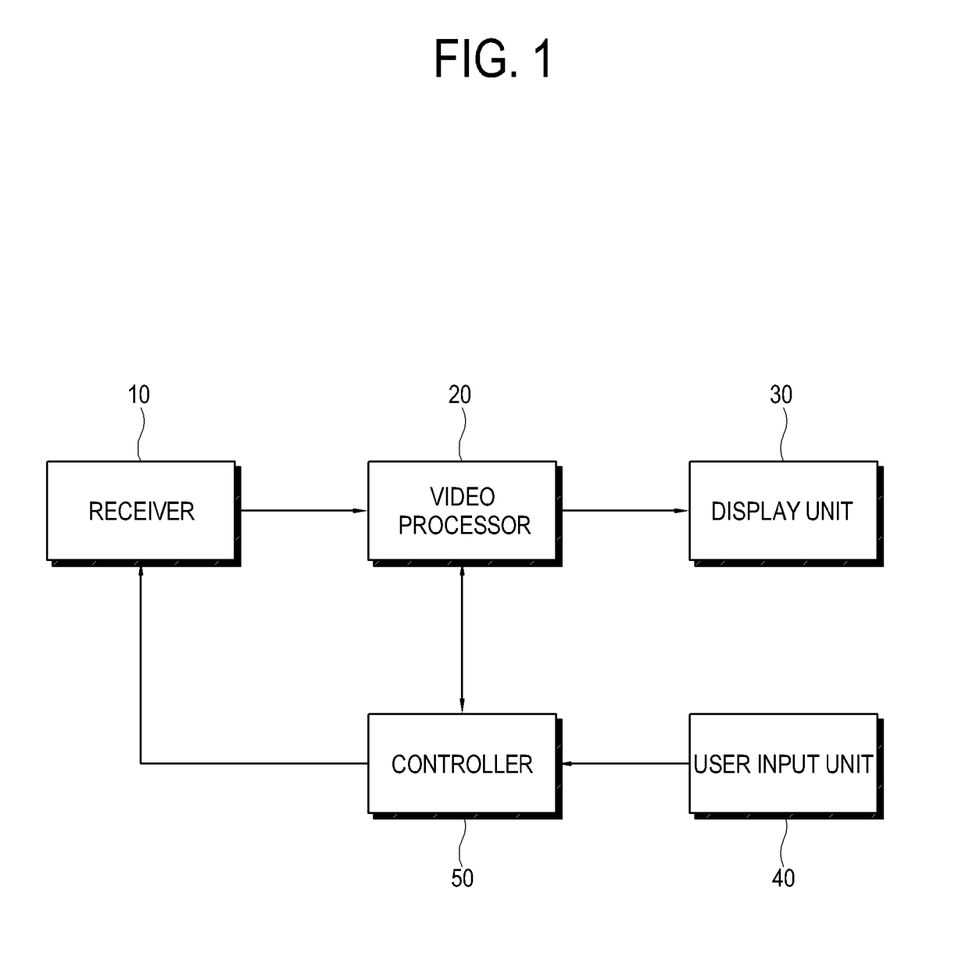
FIG. 1 is a control block diagram of a video processing apparatus according to exemplary embodiments of the present invention.

Hereinafter, a video processing apparatus according to a first exemplary embodiment of the present invention will be described with reference to FIGS. 1 and 2. As shown in FIG. 1, the video processing apparatus includes a receiver 10, a video processor 20, a display unit 30, a user input unit 40 and a controller 50.

The receiver 10 according to the present embodiment includes a tuner (not shown) to receive a broadcast signal. The broadcast signal may include video program, audio program or a data service. The tuner may include a single or a plurality of tuners, a demodulator to demodulate a tuned signal, a decoder, a multiplexer, etc. The tuner tunes a broadcast signal having a frequency band corresponding to a tuning control signal of the controller 50 (to be described later). For example, if a digital broadcast signal is received, the demodulator VSB (vestigial side band) demodulates the received broadcast signal and corrects errors, and outputs the result into a transport stream. The tuner includes an analog tuner and a digital tuner to receive an analog broadcast signal and a digital broadcast signal respectively, or a multi tuner to receive both of them.

The broadcast signal may include a multi mode service (MMS) in which a plurality of video images having a video signal, an audio signal and a data signal are supplied through a single frequency band. A major channel refers to a frequency band while a minor channel refers to a plurality of video images.

The digital broadcast signal of the tuned channel is processed by the video processor 20 and then displayed on the display unit 30. Here, the video processor 20 may provide various functions corresponding to formats of inputted video signals. For example, the video processor 20 may have functions such as an A/D conversion function to convert various types of inputted video signals into a digital signal in a certain format, a digital decoding function, a scaling function to scale a vertical frequency, resolution, a picture ratio of inputted digital video signal and/or analog video signal according to an output standard of the display unit, and a predetermined format conversion function.

The display unit 30 displays the video image processed by the video processor 20. The display unit 30 may include various display modules such as a cathode ray tube (CRT), a digital light processing (DLP), a liquid crystal display (LCD) and a plasma display panel (PDP). The display unit 30 may be provided as an external device.

The user input unit 40 includes a key to select the major channel. The user input unit 40 may include a remote controller or a menu key provided in a casing to input a selection signal, and a key signal generator to generate a key signal corresponding to user's key manipulation. The user input unit 40 may further include a number key, a direction key and a function key to select functions provided in the video processing apparatus.

If the major channel is selected, the controller 50 controls to select one of a plurality of minor channels of the selected major channel. The controller 50 may include a CPU, a microcomputer, etc.

More specifically, the controller 50 according to the present embodiment determines whether the selected major channel includes the plurality of minor channels if the major channel is selected through the user input unit 40.

The controller 50 transmits a tuning control signal to the receiver 10 to tune a frequency band corresponding to the major channel selected through the user input unit 40. The controller 50 determines whether the received major channel includes the plurality of minor channels. One of the ways to determine whether the received major channel includes a plurality of minor channels is to evaluate the received virtual channel table (VCT) that has been received by the receiver.

If the selected major channel includes the plurality of minor channels, the controller 50 controls to select one of the minor channels based on a preset priority. A video of the selected minor channel is processed by the video processor 20 to be displayed on the display unit 30.

The priority may be set by at least one of resolution of video images, genres and channel numbers of the respective minor channels. Alternatively, other conditions of the priority may be set by a user.

If the major channel is selected, the controller 50 checks additional information included in the video images of the minor channels of the selected major channel.

If resolution is set as the priority, the controller 50 compares the resolution of the video images of the minor channels, and controls to select the minor channel having the highest resolution.

Figure 2:
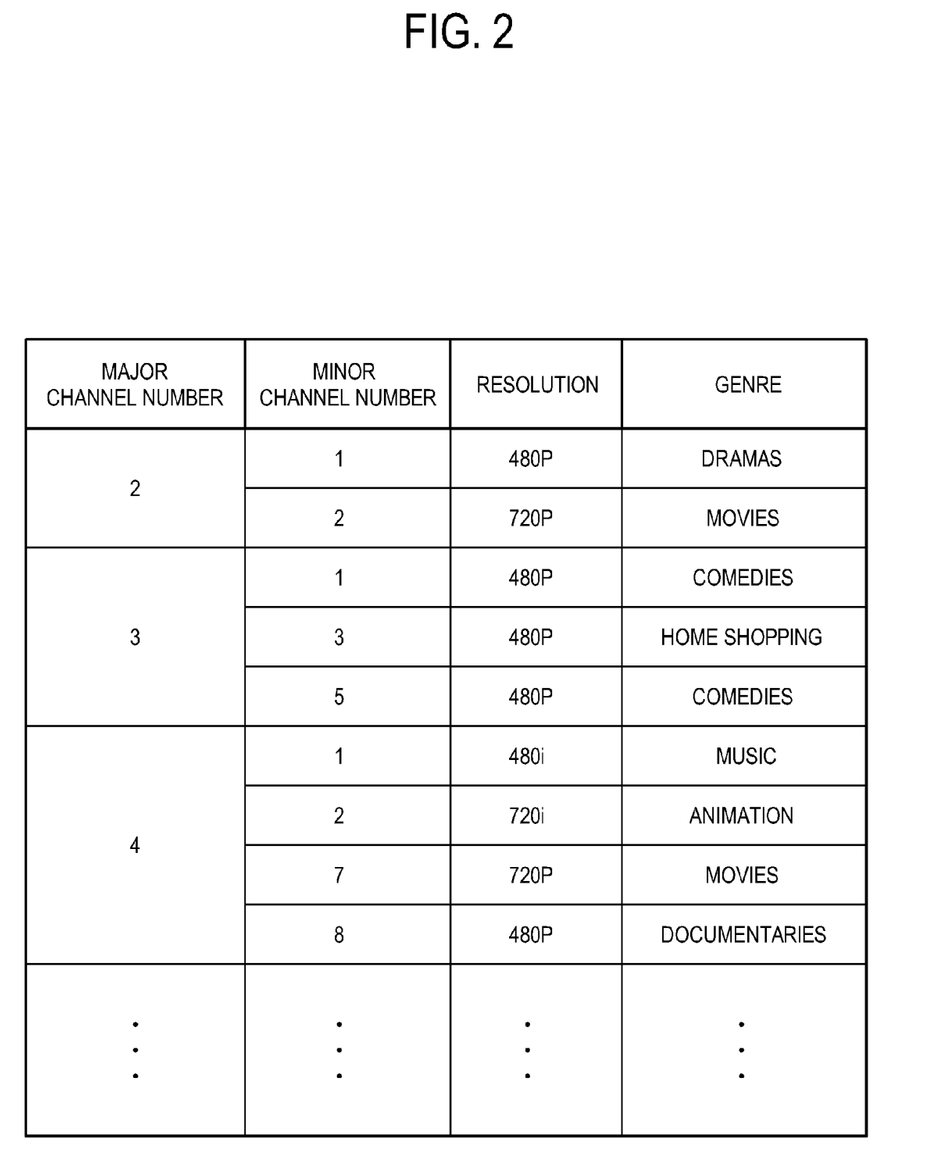
FIG. 2 illustrates an example of a minor channel included in a major channel in the video processing apparatus according to the exemplary embodiments of the present invention.

Referring to FIG. 2, if a user selects a major channel 4, the minor channels thereof are 4-1, 4-2, . . . 4-3, 4-4. The respective resolutions thereof are 480i, 720i, 720p and 480p. Then, the controller 50 controls to select the minor channel 4-3 which has the highest resolution of 720p among the four minor channels. The controller 50 controls the video processor 20 to process a video of the minor channel 4-3.

If a favorite genre is set as the priority, the controller 50 checks the genre (e.g. dramas, actions, romances, comedies) of the video images of the minor channels, and selects the minor channel having the video images of a user's favorite genre.

Referring to FIG. 2, if a user selects a major channel 3, the minor channels thereof are 3-1, 3-3 and 3-5. The genres of the minor channels are comedies, home shopping and comedies, respectively. If the favorite genre set by a user is home shopping, the controller 50 controls to select the minor channel 3-3.

The favorite genre may be set by a user. Alternatively, the viewing number of the images is accumulated per genre, and the genre that is most frequently viewed is determined as the favorite genre. Then, the minor channel supplying the favorite genre may be selected from the minor channels of the selected major channel.

If the channel number is set as the priority, the controller 50 may control to select a minor channel having a smallest channel number among the plurality of minor channels.

Referring to FIG. 2, if the selected major channel is 1, the minor channels thereof are 1-1 and 1-2. Then, the controller 50 controls to select the minor channel 1-1 having the smallest channel number.

As applied to the favorite genre, the favorite resolution, favorite minor channel number and other favorite characteristics of the minor channel may be accounted for in automatically selecting a minor channel. That is, taking the example of the favorite resolution, the number of times of each of the resolutions of the minor channel that is being viewed may be accumulated in order to determine the favorite resolution (the most viewed resolution). Having done so, if the user selects the favorite resolution as the priority factor for automatically selecting a minor channel, the controller 50 select the minor channel having the favorite resolution.

Figure 3:
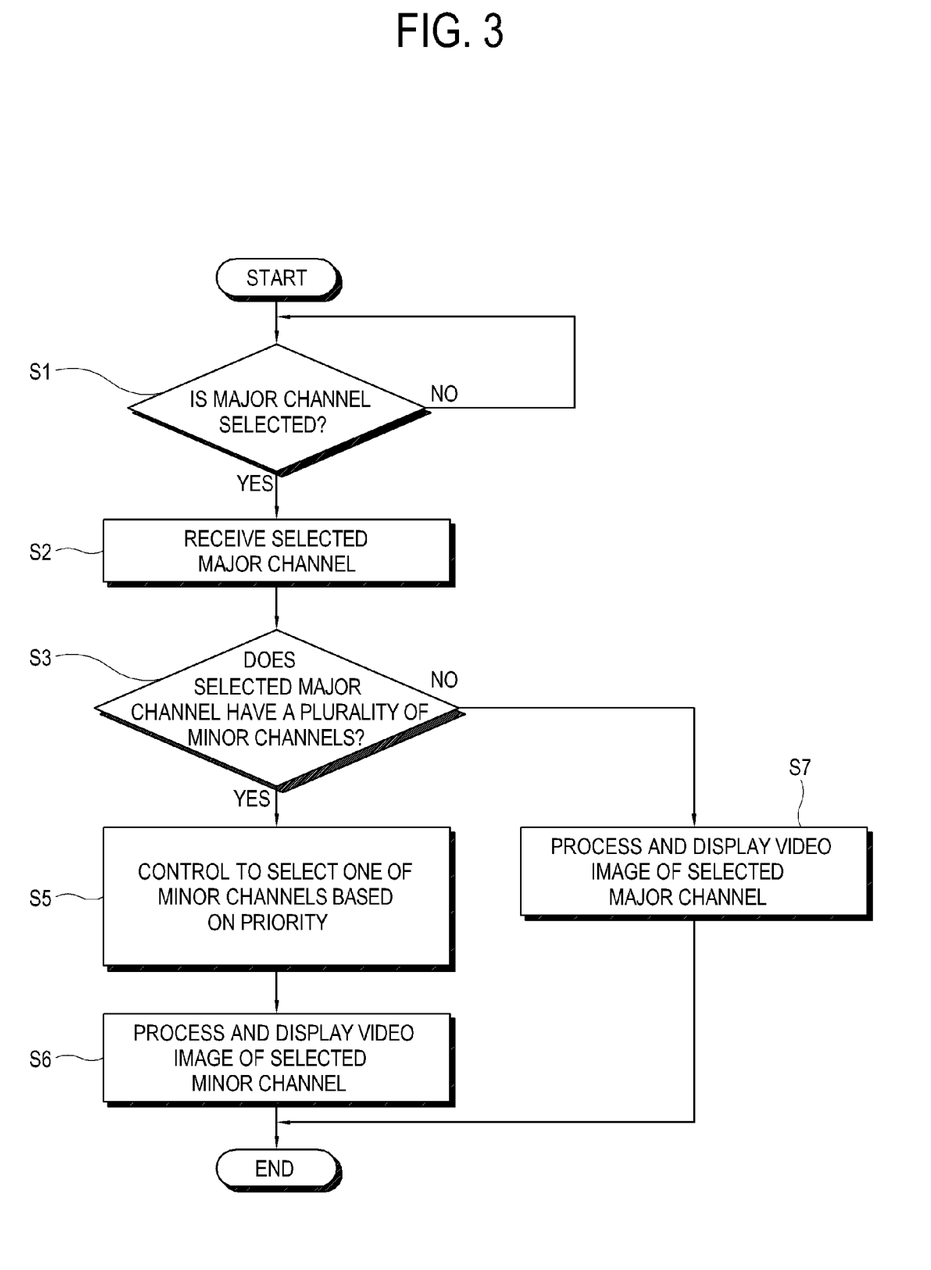
FIG. 3 is a flowchart to describe a control method of a video processing apparatus according to a first exemplary embodiment of the present invention.

A control method of the image processing apparatus according to the first exemplary embodiment of the present invention will be described with reference to FIG. 3.

As shown therein, if a user selects the major channel (S1), the controller 50 controls to receive the selected major channel (S2).

Then, the controller 50 determines whether the received major channel has the plurality of minor channels (S3).

If it is determined at operation S3 that the selected major channel includes the plurality of minor channels, the controller 50 controls to select one of the minor channels based on the preset priority (S5). As described above, the priority may be set from at least one of the resolutions of the video images, the genres and channel numbers of the minor channels. Alternatively, the priority may be set by a user.

The controller 50 controls to process and display the video image of the selected minor channel (S6).

If it is determined at operation S3 that the selected major channel does not include the plurality of minor channels, the controller 50 controls to process and display the video image of the selected major channel (S7).

Thus, if a user selects the major channel, the image corresponding to one of the minor channels of the major channel may be automatically selected.

Then, a user may select the major channel only and view the high quality video image or the video image of the favorite genre among the plurality of minor channels of the selected major channel, thereby enhancing user's convenience.

Second Exemplary Embodiment

Hereinafter, a video processing apparatus according to a second exemplary embodiment of the present invention will be described with reference to FIGS. 1 and 2.

According to the first exemplary embodiment, one of resolution, favorite genre and channel number is set as the priority. According to the second exemplary embodiment, however, resolution, favorite genre and channel number are sequentially set as the priority.

A controller 50 according to the second exemplary embodiment controls to receive a selected major channel if a user selects the major channel. The controller 50 determines whether the received major channel includes a plurality of minor channels. If it is determined that the major channel includes the plurality of minor channels, the controller 50 checks additional information on video images of the minor channels.

First, the controller 50 checks the resolution of the video images of the minor channels and controls to select the minor channel having the highest resolution. If the video images of the minor channels have the same resolution, the controller 50 checks the genre of the minor channels and controls to select the minor channel providing a user's favorite genre.

If the genres of the minor channels are the same, the controller 50 controls to select the minor channel having the smallest channel number among the plurality of minor channels.

Referring to FIG. 2, if a user selects a major channel 3, the minor channels thereof are 3-1, 3-3 and 3-5. The controller 50 checks the resolution of the video images of the minor channels.

As shown therein, the video images of the minor channels have the same resolution of 480p. As the resolution is the same, the controller 50 checks whether the genre equivalent to the favorite genre exists.

If the user's favorite genre is comedies, the controller 50 selects the minor channel 3-1 having the smaller channel number, among the minor channels 3-1 and 3-5 providing comedies. The favorite genre may be extended to favorite resolution, favorite minor channel number and etc.

A control method of the video processing apparatus according to the second exemplary embodiment of the present invention will be described with reference to FIGS. 4A and 4B.

Figure 4A:
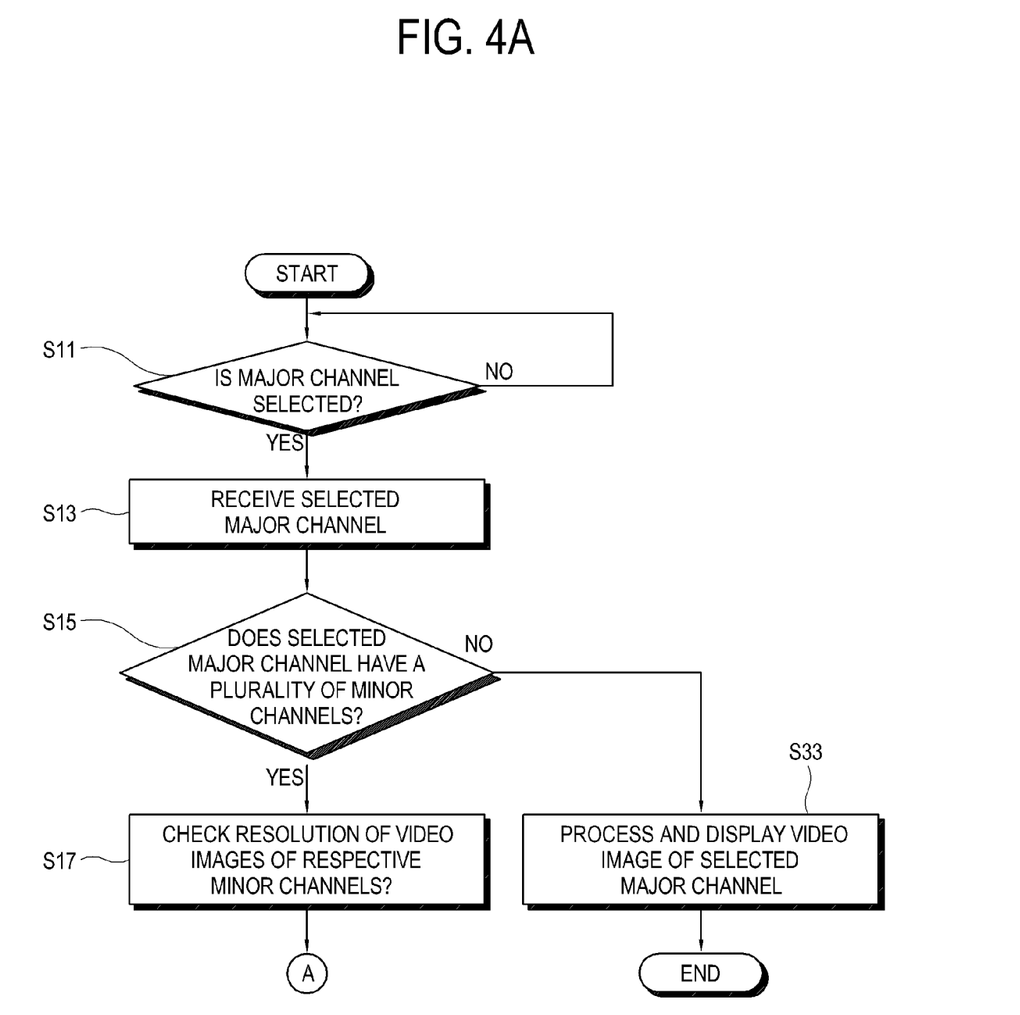
FIGS. 4A and 4B are flowcharts to describe a control method of a video processing apparatus according to a second exemplary embodiment of the present invention.
Figure 4B:
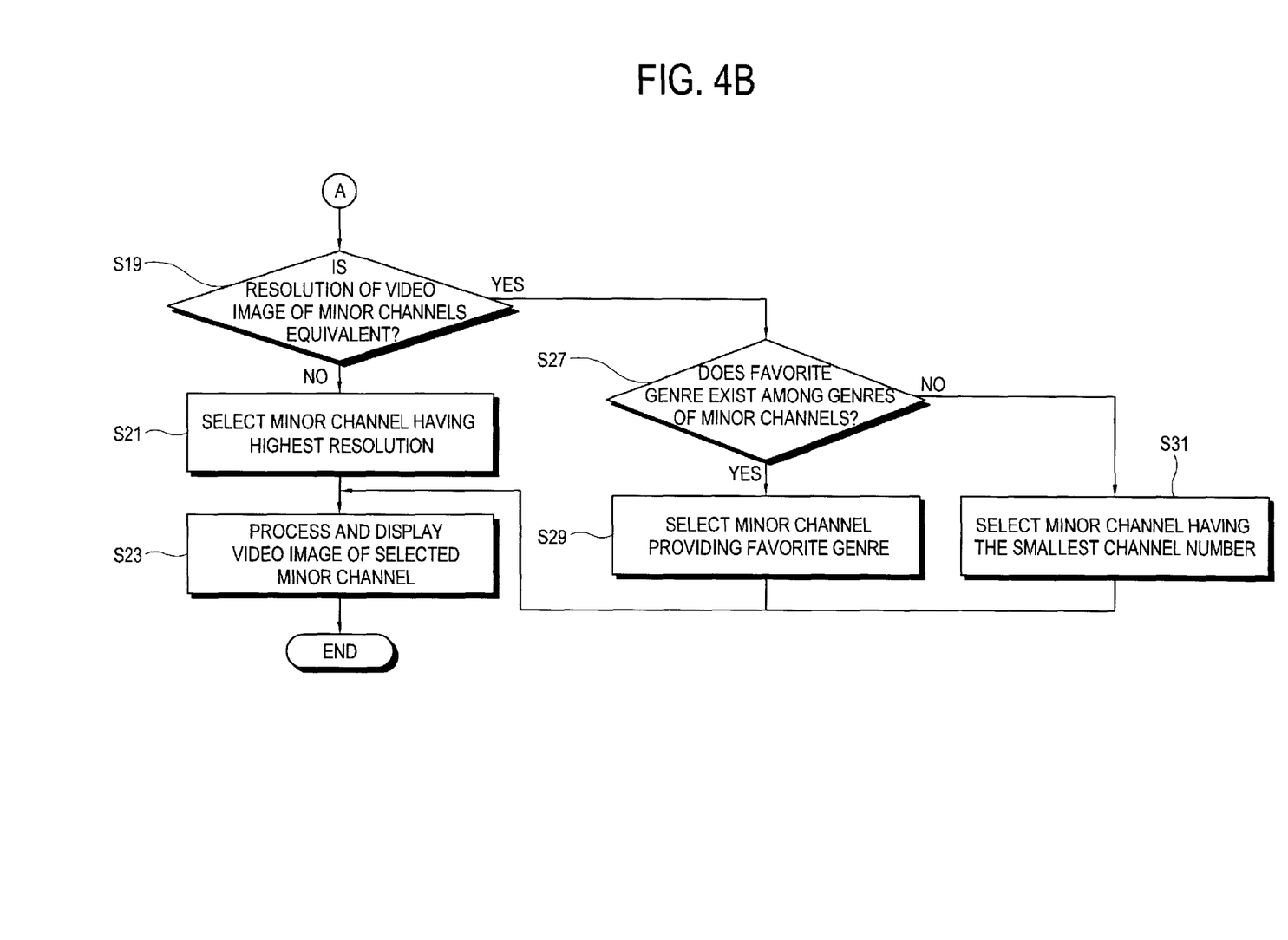

As shown in FIG. 4A, if a user selects the major channel (S11), the controller 50 controls to receive the selected major channel (S13).

Then, the controller 50 determines whether the received major channel includes the plurality of minor channels (S15).

If it is determined at operation S15 that the selected major channel includes the plurality of minor channels, the controller 50 checks the resolution of the video images of the minor channels based on the preset priority (S17).

If it is determined at operation S17 that the video images of the minor channels do not have the same resolution, the controller 50 controls to select the minor channel having the highest resolution (S21).

Then, the controller 50 controls to process and display the video image of the selected minor channel (S23).

If it is determined at operation S17 that the video images of the minor channels have the same resolution, the controller 50 checks whether the user's favorite genre exists among the genres of the minor channels (S27).

If it is determined at operation S27 that the favorite genre exists, the controller 50 controls to select the minor channel providing the favorite genre (S29), and controls to process the video image of the selected minor channel (S23).

If it is determined at operation S27 that the favorite genre does not exist, the controller 50 controls to select the minor channel having the smallest channel number (S31), and controls to process the video image of the selected minor channel (S23).

If it is determined at operation S15 that the selected major channel does not include the plurality of minor channels, the controller 50 controls to process and display the video image of the selected major channel (S33).

According to the second exemplary embodiment, the resolution, the favorite genre and the channel number are sequentially set as the priority. Alternatively, the items (e.g. resolution, favorite genre, channel number, etc.) included in the priority may be set in a different order.

If a user selects the major channel, the channel is changed into one of the plurality of minor channels of the major channel. Thus, a user selects only the major channel, and may have the same effect as selecting the major channel and minor channel at the same time.

Third Exemplary Embodiment

Hereinafter, a video processing apparatus according to a third exemplary embodiment of the present invention will be described with reference to FIGS. 1 and 2.

According to the third exemplary embodiment, resolution of video images of the minor channels, favorite genre and channel number have a weight, respectively. The priority is set by the weight of the minor channels as an example. The favorite genre may be extended to favorite resolution, favorite minor channel number and etc.

A controller 50 assigns a higher weight to higher resolution, and a smaller channel number in the case of a user's favorite genre. The controller 50 calculates the weights of the minor channels of the major channel selected by a user.

For example, if the resolution of a transmittable video image is 480i, 480p, 720i, 720p, 1080i and 1080p, the weight of 480i is set as 1, the weight of 480p is 2, the weight of 720i is 3, the weight of 720p is 4, the weight of 1080i is 5 and the weight of 1080p is set as 6. If the genre of the minor channels is the user's favorite genre, the weight is set as 3. If the genre is not the favorite genre, the weight is set as 1. The weight of the largest channel number of the plurality of minor channels is set as 1; and the weight increases as much as 1 as the channel number becomes smaller.

Referring to FIG. 2, it is presumed that a user selects a major channel 4 and the user's favorite genre is animation.

The controller 50 calculates the weight of the minor channels 4-1, 4-2, 4-7 and 4-8 of the major channel 4, respectively. The minor channel 4-1 has the resolution weight of 1, the genre weight of 1 and the channel number weight of 4. Thus, the total weight of the minor channel 4-1 is 6. The minor channel 4-2 has the resolution weight of 3, the genre weight of 3 and the channel number weight of 2. The total weight of the minor channel 4-2 is 8. According to the same method, the total weight of the minor channel 4-3 is 7, and the total weight of the minor channel 4-4 is 4.

Thus, the controller 50 selects the minor channel 4-2 having the largest weight, and controls to process and display the video image of the minor channel 4-2.

If a user selects the major channel only, the video processing apparatus checks the various conditions such as the resolution of the video images of the plurality of minor channels and the user's favorite genre and controls to automatically select the most proper minor channel. Thus, a user's convenience may enhance.

Fourth Exemplary Embodiment

Hereinafter, a video processing apparatus according to a fourth exemplary embodiment of the present invention will be described with reference to FIG. 1.

According to the fourth exemplary embodiment, the priority is set by user's viewing history. That is, a controller 50 accumulates the selected number of a plurality of minor channels of a major channel. If a user selects the major channel, the controller 50 checks the accumulated number of the minor channels of the major channel. The controller 50 then controls to select the minor channel having the largest accumulated number, i.e. the most-frequently-selected minor channel.

If a user selects the major channel only, the channel is automatically changed to the most-frequently-selected minor channel according to the viewing history among the minor channels of the selected major channel. Thus, user's convenience may enhance.

As described above, the present invention provides a video processing apparatus which automatically selects one of a plurality of minor channels of a major channel if a user selects the major channel only, and a control method thereof.

Also, the present invention provides a video processing apparatus which checks information on a plurality of minor channels of a major channel and automatically changes to the minor channel providing the highest quality video image or providing video images of a favorite genre, favorite resolution or favorite minor channel number etc. if a user selects the major channel only, and enhances user's convenience, and a control method thereof.

Further, the present invention provides a video processing apparatus which checks various conditions such as resolution of video images of a plurality of minor channels and a user's favorite genre and automatically selects the most proper minor channel if a user selects the major channel only, and enhances user's convenience, and a control method thereof.

Further, the present invention may be applied to major channels having minor channels with video and/or audio and/or data services.

Further, the present invention may be applied to televisions, set-top boxes, IPTV or any other devices having the capability to receive broadcast signal and/or capability to select channels which are arranged in hierarchical manner such as major-minor channel in a digital television broadcast.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:
1. A video processing apparatus, comprising:
a receiver which receives a broadcast signal corresponding to a major channel;
an image processor which processes the received broadcast signal;
a display; and
a controller which controls the receiver to receive a major channel number, and controls to evaluate a resolution of a plurality of minor channels corresponding to the major channel number,
wherein the controller further controls to select automatically a minor channel having a highest resolution among the plurality of minor channels corresponding to the major channel number in response to the evaluation indicating that the plurality of minor channels has only one minor channel having the highest resolution,
in response to the evaluation indicating that video images of the plurality of minor channels have the same resolution, the controller checks genres of the plurality of minor channels and controls to select a minor channel providing a favorite genre of a user, wherein the favorite genre is determined as a genre that is most frequently viewed by the user; and the controller further controls the image processor to process a video image of the selected minor channel, and controls the display to display the processed video image;
wherein the selected major channel is a physical frequency band.

2. The video processing apparatus according to claim 1, wherein the controller further selects one of the minor channels according to a priority comprising a channel number of the minor channels.

3. The video processing apparatus according to claim 2, wherein the priority is set by the user.

4. The video processing apparatus according to claim 2, wherein the priority is set by a weight that is calculated based on resolution of video images, the favorite genre and the channel number of the minor channels.

5. The video processing apparatus according to claim 2, wherein the priority is set by a viewing history of the user.

6. The video processing apparatus according to claim 2, wherein the priority comprises a plurality of items including a first item and a second item different from the first item, and the controller selects one of the minor channels according to the second item if information on the plurality of minor channels corresponding to the first item is equivalent.

7. The video processing apparatus according to claim 1, further comprising a user input unit to select the major channel.

8. The video processing apparatus according to claim 1, further comprising: a user input unit with which the user enters the major channel number,
wherein the one of the minor channels is automatically selected in response to the user entering the major channel number.

9. The apparatus according to claim 1, wherein if the plurality of minor channels have differing resolutions, the controller selects one channel from the plurality of minor channels with the highest resolution.

10. The apparatus according to claim 2, wherein the controller evaluates the preset priority in a sequential order by evaluating the channel number.

11. A control method of a video processing apparatus, comprising:
determining, by a controller of the video processing apparatus, whether one of a plurality of major channels is selected;
receiving, by a receiver of the video processing apparatus, a broadcast signal corresponding to the selected major channel;
processing, by an image processor of the video processing apparatus, the received broadcast signal;
determining, by the controller, whether the selected major channel corresponds to a plurality of minor channels;
in response to determining that the selected major channel corresponds to the plurality of minor channels, evaluating a resolution of the plurality of minor channels corresponding to the selected major channel;
selecting automatically, by the controller, one of the minor channels having a highest resolution among the plurality of minor channels corresponding to the selected major channel in response to the evaluating indicating that the plurality of minor channels has only one minor channel having the highest resolution,
checking, by the controller, genres of the plurality of minor channels and selecting a minor channel providing a favorite genre of a user in response to the evaluating indicating that video images of the plurality of minor channels have the same resolution, wherein the favorite genre is determined as a genre that is most frequently viewed by the user; and
processing a video image of the selected minor channel, and displaying the processed video image;
wherein the selected major channel is a physical frequency band.

12. The control method according to claim 11, further comprising selecting one of the minor channels according to a priority comprising a channel number.

13. The control method according to claim 12, wherein the priority is set by the user.

14. The control method according to claim 12, wherein the priority is set by a weight that is calculated based on resolution of the video images, the favorite genre and the channel number of the plurality of minor channels.

15. The control method according to claim 12, wherein the priority is set by a viewing history of the user.

16. The control method according to claim 12, wherein the priority comprises a plurality of items including a first item and a second item different from the first item, and the selecting one of the minor channels comprises selecting one of the minor channels according to the second item if information on the plurality of minor channels corresponding to the first item is equivalent.

17. The control method according to claim 12, wherein the priority is a favorite characteristic of the minor channel.

18. The control method according to claim 17, wherein the favorite characteristic of the minor channel is determined according to a number of viewing times of the minor channel having the favorite characteristic.

19. The control method according to claim 18, wherein the favorite characteristic is a resolution of a video broadcast signal.

20. The control method according to claim 17, wherein the favorite characteristic is a minor channel number.

21. The control method according to claim 12, further comprising evaluating the priority in a sequential order by evaluating the channel number.

22. The control method according to claim 11, wherein the broadcast signal is a video broadcast signal.

23. The control method according to claim 11, wherein the broadcast signal is an audio broadcast signal.

24. The control method according to claim 11, wherein the broadcast signal is a data broadcast signal.

25. The control method according to claim 11, wherein the video processing apparatus is a television broadcast receiver.

26. The control method according to claim 25, wherein the television broadcast receiver is an IPTV.

27. The control method according to claim 25, wherein the television broadcast receiver includes a display screen.

28. The control method according to claim 11,
wherein a user enters the selected major channel into a user input unit, and
wherein the one of the minor channels is automatically selected in response to the user entering the selected major channel.

29. The control method according to claim 11, wherein if the plurality of minor channels have differing resolutions, the selecting further comprises selecting one channel from the plurality of minor channels with the highest resolution.

* * * * *